(12) United States Patent
DeLisse et al.

(10) Patent No.: US 10,990,614 B1
(45) Date of Patent: Apr. 27, 2021

(54) ENDPOINT DEVICE RELATIONSHIPS IN PROCESSING USER INPUTS

(71) Applicant: Amazon Technologies, Inc., Seattle, WA (US)

(72) Inventors: Adam DeLisse, Seattle, WA (US); Antonio Vargas Garcia, Redmond, WA (US); Brandt Elster, Seattle, WA (US); Milan Krneta, Seattle, WA (US); Mark Aiken, Seattle, WA (US); Caglar Iskender, Redmond, WA (US); Timothy Etters, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 351 days.

(21) Appl. No.: 16/136,092

(22) Filed: Sep. 19, 2018

(51) Int. Cl.
| | |
|---|---|
| *G10L 15/00* | (2013.01) |
| *G06F 16/28* | (2019.01) |
| *G06F 9/54* | (2006.01) |
| *G10L 15/26* | (2006.01) |
| *G06F 40/253* | (2020.01) |
| *G06F 40/295* | (2020.01) |
| *G10L 15/22* | (2006.01) |
| *G10L 15/07* | (2013.01) |

(52) U.S. Cl.
CPC .............. *G06F 16/288* (2019.01); *G06F 9/54* (2013.01); *G06F 40/253* (2020.01); *G06F 40/295* (2020.01); *G10L 15/22* (2013.01); *G10L 15/26* (2013.01); *G10L 15/07* (2013.01)

(58) Field of Classification Search
CPC combination set(s) only.
See application file for complete search history.

*Primary Examiner* — Vu B Hang
(74) *Attorney, Agent, or Firm* — Pierce Atwood LLP

(57) ABSTRACT

Techniques for enabling entities to provide a system with data representing specific relationships of various endpoint devices for the purpose of responding to user inputs are described. A system may include an application program interface (API) that enables an entity to provide the system with data describing related endpoint devices, as well as data representing terminology that a user may use to refer to a specific endpoint device. After the system receives such data, when a user associates an endpoint device with their user profile, the system can associate that endpoint device with various other endpoint devices based on data previously received from an entity. When the system receives a user input, the system may traverse endpoint device relationships, represented in a user profile, to determine an endpoint device that should be invoked to respond to the user input.

20 Claims, 15 Drawing Sheets

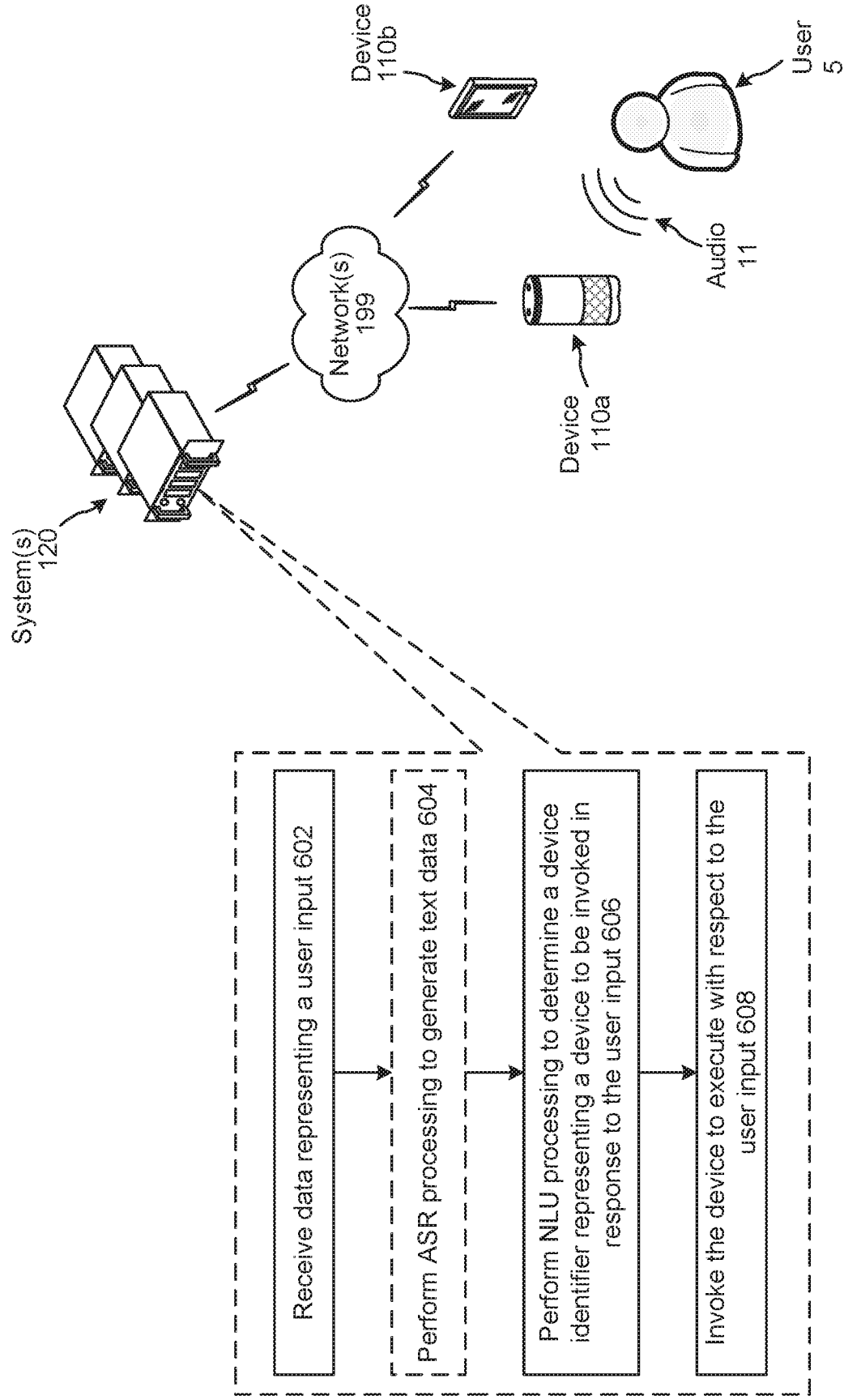

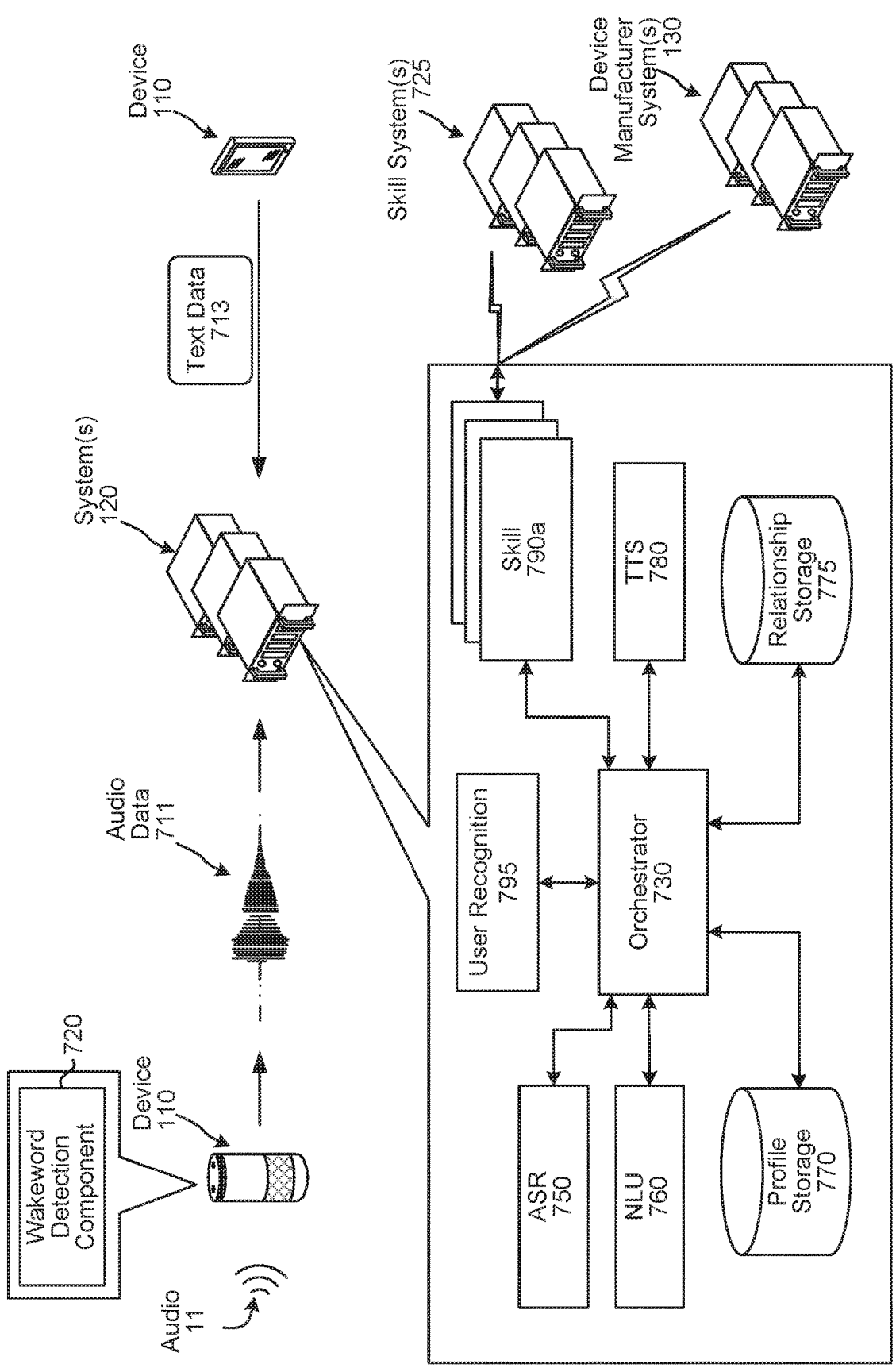

FIG. 8

| Endpoint Identifier | Name | Relationship(s) | Capability | Identifier | Name | Modes \| Presets | Name |
|---|---|---|---|---|---|---|---|
| 1 | Fan | --- | Power Controller | --- | --- | --- | --- |
| | | | Range | A | Speed | MIN | Min |
| | | | | | | MAX | Max |
| | | | Mode | B | Direction | UP | Upwards |
| | | | | | | DOWN | Downwards |
| 2 | Stove | Contains 3; Contains 4 | Power Controller | --- | --- | --- | --- |
| 3 | Left Burner | Left of 4 | Power Controller | --- | --- | --- | --- |
| | | | Range | C | Heat | LOW | Low |
| | | | | | | MEDIUM | Medium |
| | | | | | | HIGH | High |
| | | | Binary | D | Simmer | --- | --- |
| 4 | Right Burner | Right of 3 | Power Controller | --- | --- | --- | --- |
| | | | Range | E | Heat | LOW | Low |
| | | | | | | MEDIUM | Medium |
| | | | | | | HIGH | High |
| | | | Binary | F | Simmer | --- | --- |

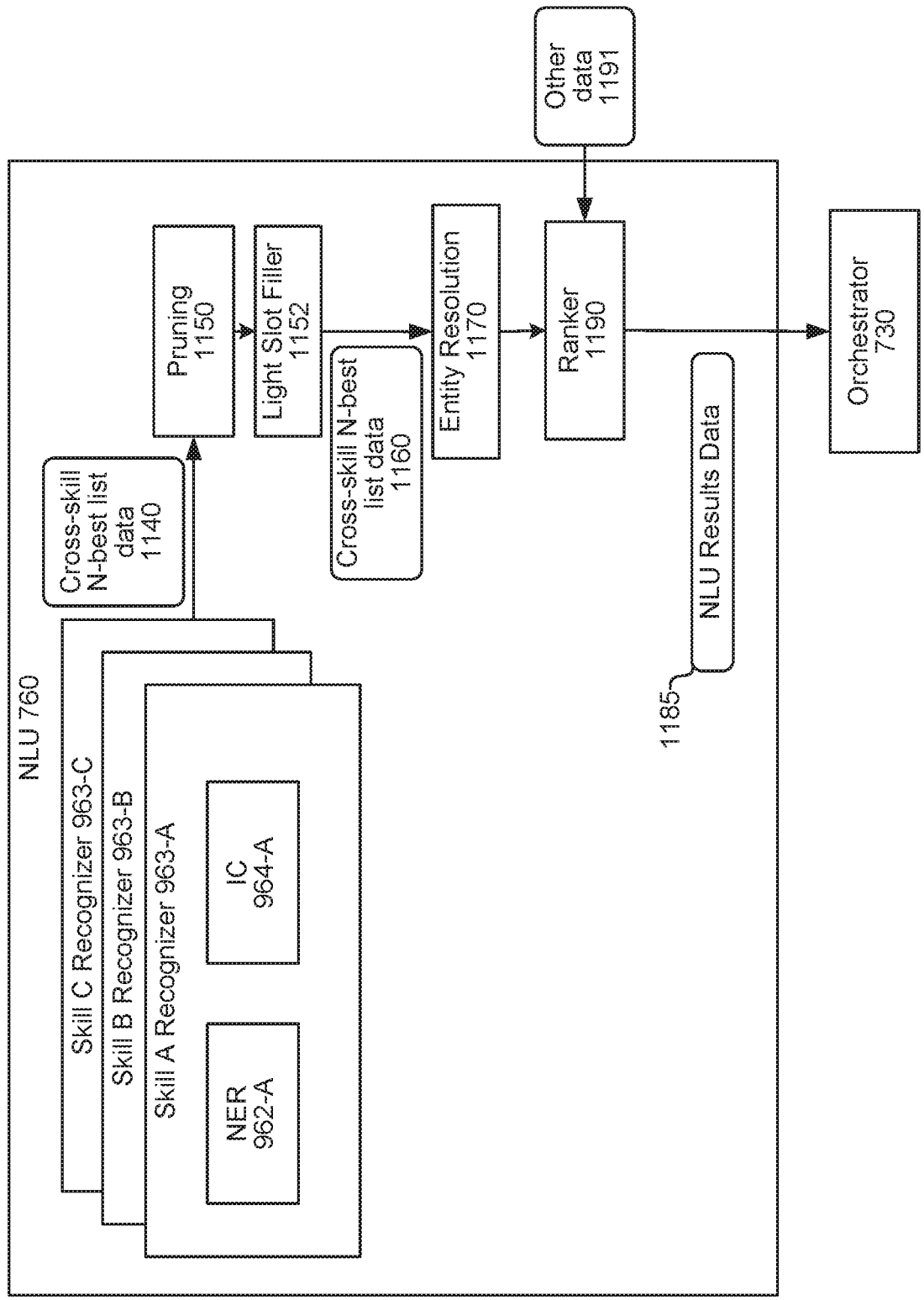

FIG. 12

| Endpoint Identifier | Name | Relationship(s) | Capability | Identifier | Name | Modes / Presets | Name |
|---|---|---|---|---|---|---|---|
| 2 | Stove | Contains 3; Contains 4 | Power Controller | --- | --- | --- | --- |
|   |   |   | Power Controller | --- | --- | --- | --- |
| 3 | Left Burner | Left of 4 | Range | C | Heat | LOW | Low |
|   |   |   |   |   |   | MEDIUM | Medium |
|   |   |   |   |   |   | HIGH | High |
|   |   |   | Binary | D | Simmer | --- | --- |

User Input: Turn on the left burner of the oven

<ActivateBurner> Grammar Framework: {Endpoint Device 1} {Endpoint Device 2} {Endpoint Device N}

Populated <ActivateBurner> Grammar Framework: {Endpoint Device 1}: "left burner", {Endpoint Device 2}: "oven"

Resolved <ActivateBurner> Grammar Framework: {Endpoint Device 1}: "left burner", identifier: 3; {Endpoint Device 2}: "oven", identifier 2

US 10,990,614 B1

ENDPOINT DEVICE RELATIONSHIPS IN PROCESSING USER INPUTS

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is referred to herein as speech processing. Speech processing may also involve converting a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 6 illustrates a system configured to respond to a user input by traversing data representing endpoint device relationships according to embodiments of the present disclosure.

FIG. 7 is a conceptual diagram of components of a system according to embodiments of the present disclosure.

FIG. 8 illustrates device profile data representing endpoint devices according to embodiments of the present disclosure.

FIG. 11 is a conceptual diagram of how natural language understanding processing is performed according to embodiments of the present disclosure.

FIG. 12 illustrates how entity resolution processing may include using user profile data to populate slots with endpoint device identifiers according to embodiments of the present disclosure.

DETAILED DESCRIPTION

Figure 1:
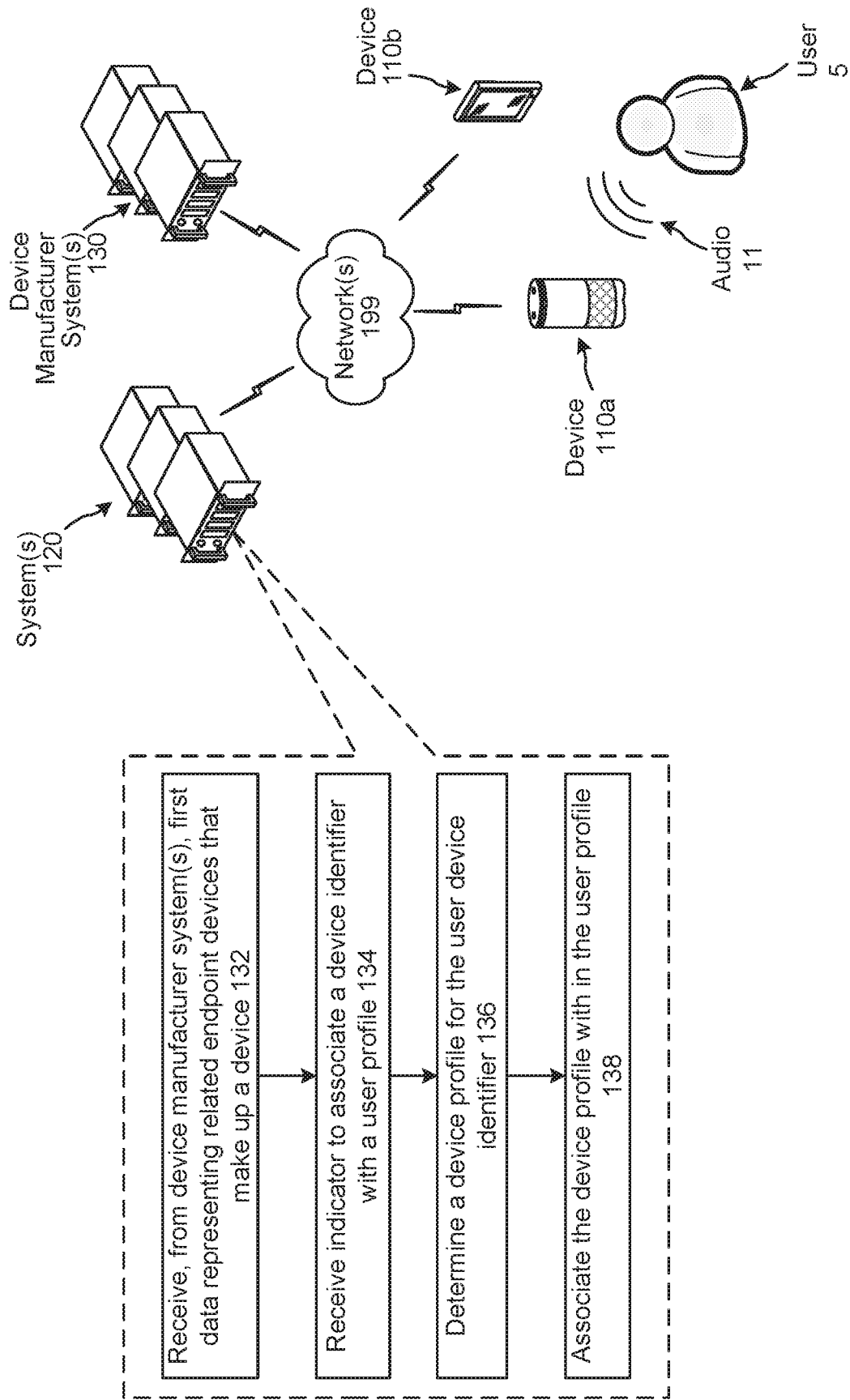
FIG. 1 illustrates a system configured to receive data representing endpoint device relationships as well as associate such endpoint devices with a user profile according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, turn on my stereo," a system may turn on a stereo associated with a user profile.

Systems may be configured to operate with respect to various types of endpoint devices including, but not limited to, vehicles, smart phones, tablets, and appliances. Such devices may be manufactured by various entities. Such endpoint devices may include one or more other endpoint devices. For example, a vehicle may include a stereo system, a power driver side window, a power passenger side window, etc. An endpoint device may be associated with one or more functionalities.

In some examples, a user may have an endpoint device that includes at least one other endpoint device, which are configured to be invoked by a system in response to user inputs. For example, a vehicle may include a stereo that can be invoked in response to user inputs to the system. The system may not be configured to enable the manufacturer of the vehicle and/or the stereo to indicate the stereo is related to the vehicle. In other words, the system may enable the entity to provide the system with information representing how the stereo may be invoked, but not information representing the vehicle contains the stereo.

At least some systems enable a user to relate endpoint devices in their user profile. Using the above mentioned vehicle and stereo as an example, after the vehicle and the stereo are individually associated with a user profile, the user may create an association between the vehicle and the stereo in the user profile. This association may enable the stereo of the vehicle to be invoked in response to user inputs, provided to the vehicle, requesting a stereo be turned on, a channel of a stereo be changed, etc.

At least some systems may enable a manufacturer to associate endpoint devices using specific invocation names. Using the above as an example, the entity may individually provide the system with a variety of information such as information representing how the vehicle may be invoked to output content responsive to user input, information representing how the stereo may be invoked to change its volume, etc. Further, the entity may associate the stereo and the vehicle by providing the stereo with an invocation name corresponding to "vehicle's stereo" or the like.

The use of specific invocation names to associate endpoint devices has several drawbacks. First, a user input may be required to include an endpoint device's exact invocation name in order for the system to invoke the endpoint device. In other words, for systems that process a user input using string matching, the system may be unable to infer a user input requests the endpoint device be invoked if the user input does not precisely include the endpoint device's invocation name. Second, the use of specific invocation names to associate endpoint devices fails to inform the system of exactly which endpoint devices are associated (e.g., that the stereo is inside a particle vehicle instead of another vehicle).

The present disclosure improves such systems by enabling entities (e.g., manufacturers of endpoint devices) to provide a system with data representing specific relationships of various endpoint devices. The present disclosure enables such entities to have greater control over user experiences than at least some present systems. Moreover, the present disclosure enables a user to provide user inputs to invoke an endpoint device, when those same user inputs may result in a present system being unable to determine which endpoint device to invoke.

According to the present disclosure, a system may include an application program interface (API) that enables an entity to provide the system with data describing related endpoint devices, even if the system has yet to be configured to support at least one of the related endpoint devices. In addition, the API may enable the entity to provide data representing terminology that a user may use to refer to a specific endpoint device. Such enables the system to integrate various endpoint devices and provide a satisfactory user experience without requiring the system to know of the endpoint devices prior to receiving the data from the entity.

According to at least some embodiments of the present disclosure, an entity may provide a system with data representing how various endpoint devices are related to each other and/or how endpoint devices fit within an internal architecture of another endpoint device. After the system receives such data, when a user associates an endpoint device with their user profile, the system can associate that endpoint device with various other endpoint devices based on data previously received from a device manufacturer. As such, it will be appreciated that the present disclosure prevents the need for a user to manually associate endpoint devices. Using the above mentioned vehicle and stereo as an example, whereas present systems would individually represent a vehicle and the stereo in a user's profile, and the user would manually have to associate the vehicle and the stereo, the stereo would be represented as contained within the vehicle according to the present disclosure (without the user providing the vehicle's and stereo's relationship to the system).

Other use cases are possible. For example, an entity may provide a system with data representing a remote, configured to receiving spoken user inputs, is associated with a television. In another example, an entity may provide a system with data representing a remote is contained within a television, even though they are two separate endpoint devices. One skilled in the art will appreciate that various endpoint devices and their relationships are within the scope of the present disclosure.

According to the present disclosure, when a system receives a user input, the system may traverse endpoint device relationships to determine an endpoint device that should be invoked. For example, a user profile may represent a vehicle that includes a driver's window, a passenger's window, a stereo, and an air conditioner, among other things. In response to the vehicle capturing a spoken user input corresponding to "turn on my air conditioner," the system may determine the user input was captured by the vehicle, determine the vehicle is associated with a particular air conditioner in the user profile, and cause that air conditioner to be invoked. According to this example, such relationship traversal may prevent the system from inadvertently invoking a house's air conditioner that is also represented in the user profile. This is in contrast to at least some present systems that may know the user input was received from a vehicle, and may know a user profile represents the vehicle and two air conditioners (each having a specific invocation name, but may not know that one of the air conditioners is contained within the vehicle). Thus, in such present systems, a user input of "turn on my air condition" may result in the system requesting the user to provide the specific invocation name of which air conditioner (in the user profile) to invoke, which may be an undesirable user experience. Traversal of endpoint device relationships may occur during name entity recognition (NER) processing and/or entity resolution processing, which are part of NLU processing as described herein.

FIG. 1 illustrates a system configured to receive data representing endpoint device relationships as well as associate endpoint devices with a user profile based on the received data. Although the figures and discussion herein illustrate certain operational steps of the system in a particular order, the steps described may be performed in a different order (as well as certain steps removed or added) without departing from the intent of the disclosure. As illustrated in FIG. 1, the system may include one or more devices (110a/110b) local to a user 5, one or more systems 120, and one or more device manufacturer systems 130 connected across one or more networks 199.

The system(s) 120 may receive (132), from the device manufacturer system(s) 130, first data representing related endpoint devices that make up a device. One skilled in the art will appreciate that the first data may represent various types of endpoint devices and their corresponding relationships.

Figure 2:
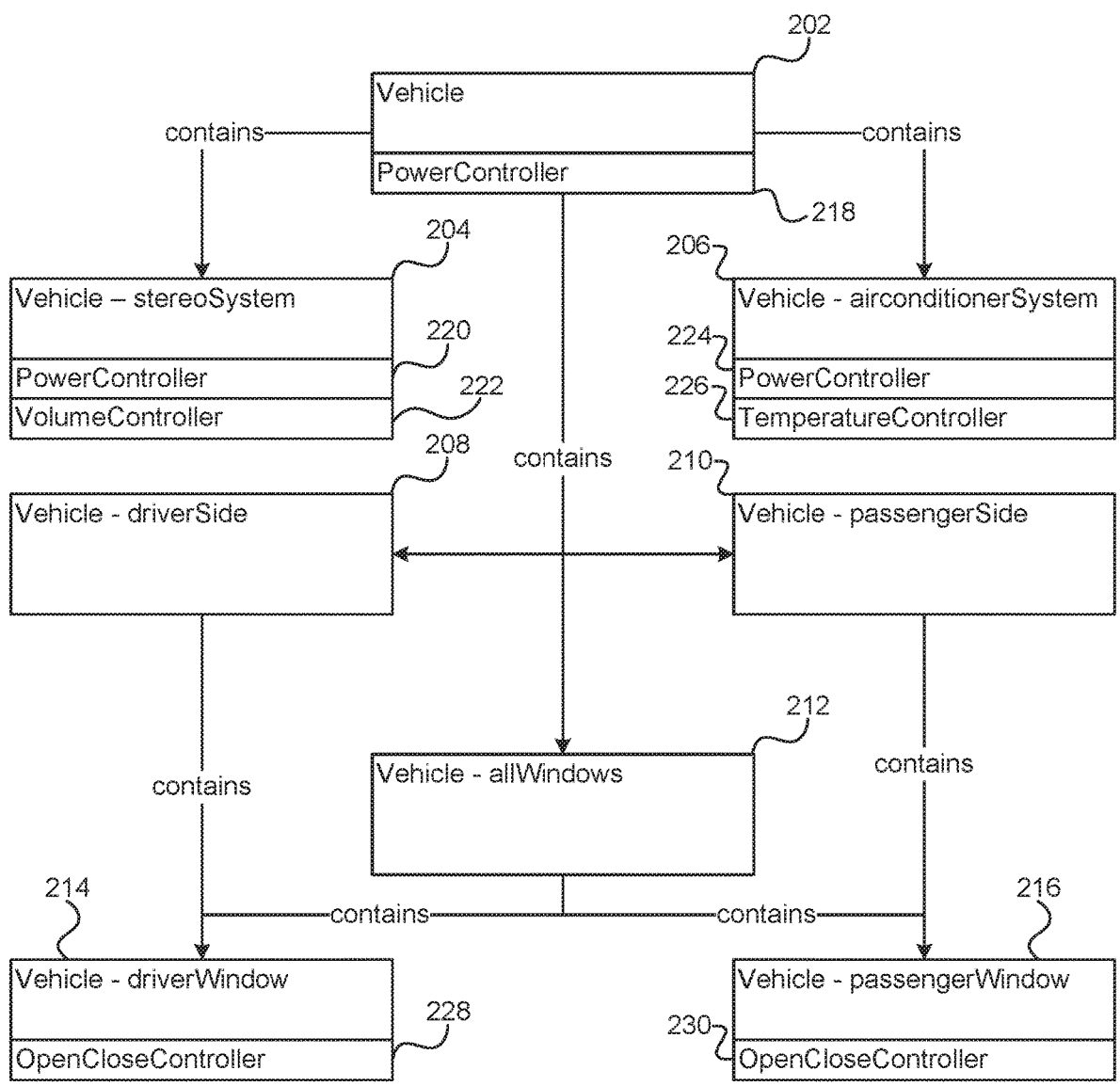
FIG. 2 is a conceptual diagram of related endpoint devices and functionality according to embodiments of the present disclosure.

For example, the first data may represent a vehicle (which may be an endpoint device itself), potential endpoint devices of the vehicle, and their relationships (as illustrated in FIG. 2). Referring to FIG. 2, the first data may represent that a vehicle 202 contains a stereo system 204, an air conditioner system 206, a driver side 208, a passenger side 210, and windows 212; the driver side 208 and the windows 212 contain a driver window 214; and the passenger side 210 and the windows 212 contain a passenger window 216.

As illustrated in FIG. 2, an endpoint device in the first data may include one or more features. For example, the vehicle 202 may include a power controller 218 (representing the system may receive user inputs to control power of the vehicle 202); the stereo system 204 may include a power controller 220 (representing the system may receive user inputs to control power of a stereo system 204 of the vehicle 202) and a volume controller 222 (representing the system may receive user inputs to control an output volume of a stereo system 204 of the vehicle 202); the air conditioner system 206 may include a power controller 224 (representing the system may receive user inputs to control power of an air conditioner 206 of the vehicle 202) and a temperature controller 226 (representing the system may receive user inputs to control an output temperature of an air conditioner 206 of the vehicle 202); the driver window 214 may include an open/close controller 228 (representing the system may receive user inputs to control positioning of a driver window 214 of the vehicle 202); and the passenger window 216 may include an open/close controller 230 (representing the system may receive user inputs to control positioning of a passenger window 216 of the vehicle 202).

Figure 3:
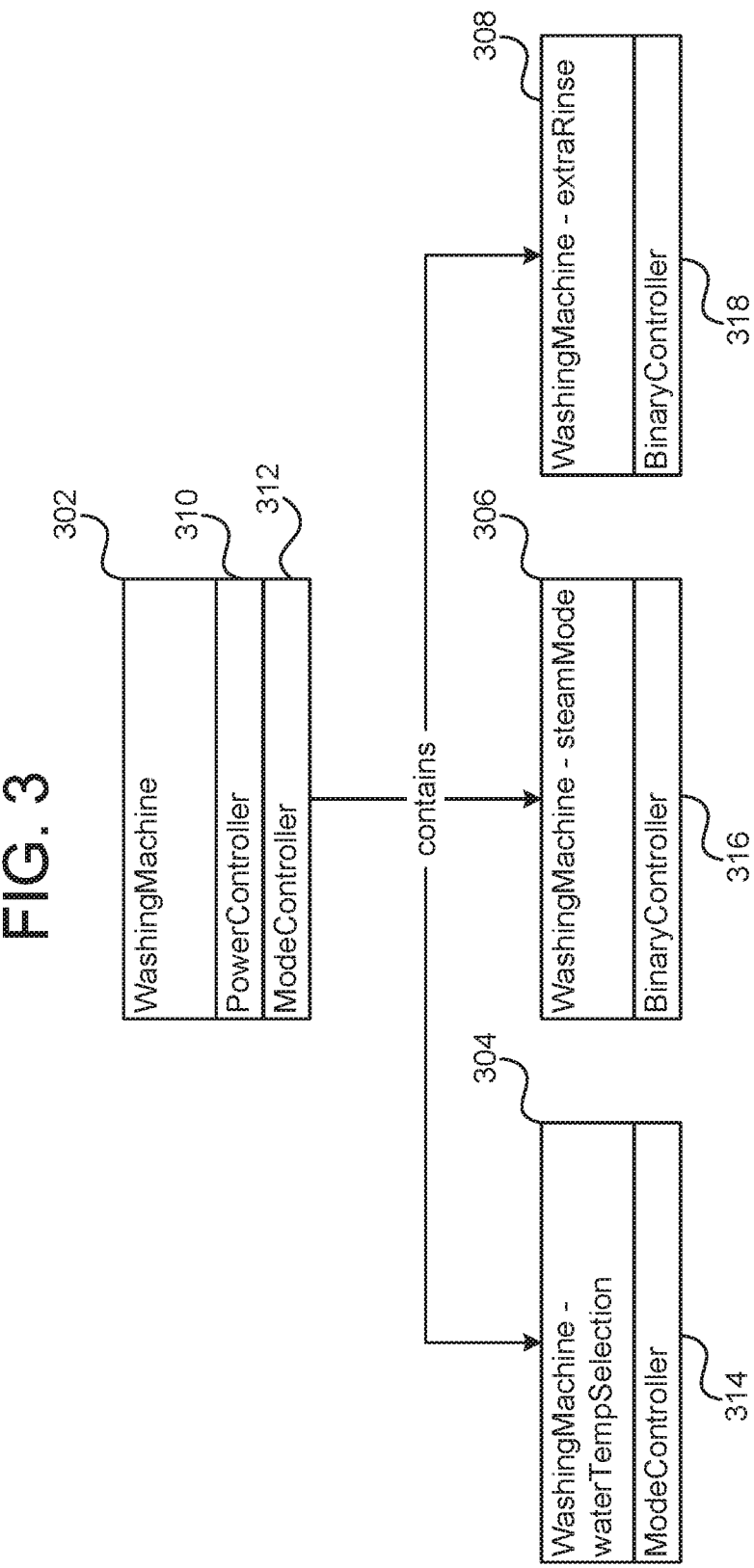
FIG. 3 is a conceptual diagram of related endpoint devices and functionality according to embodiments of the present disclosure.

For further example, the first data (received by the system(s) 120 at step 132) may represent a washing machine and its related endpoint devices (as illustrated in FIG. 3). Referring to FIG. 3, the first data may represent a washing machine 302 contains a water temperature component 304, a steam mode component 306, and an extra rinse component 308. The first data may also represent the washing machine 302 includes a power controller 310 (representing the system may receive user inputs to control power of the washing machine 302) and a mode controller 312 (representing the system may receive user inputs to control mode selection of the washing machine 302); the water temperature component 304 includes a mode controller 314 (representing the system may receive user inputs to control a water temperature of the washing machine 302); the steam mode component 306 includes a binary controller 316 (representing the system may receive user inputs to control a steam mode selection of the washing machine 302); and the extra rinse component 308 includes a binary controller 318 (representing the system may receive user inputs to control an extra rinse selection of the washing machine 302).

Figure 4:
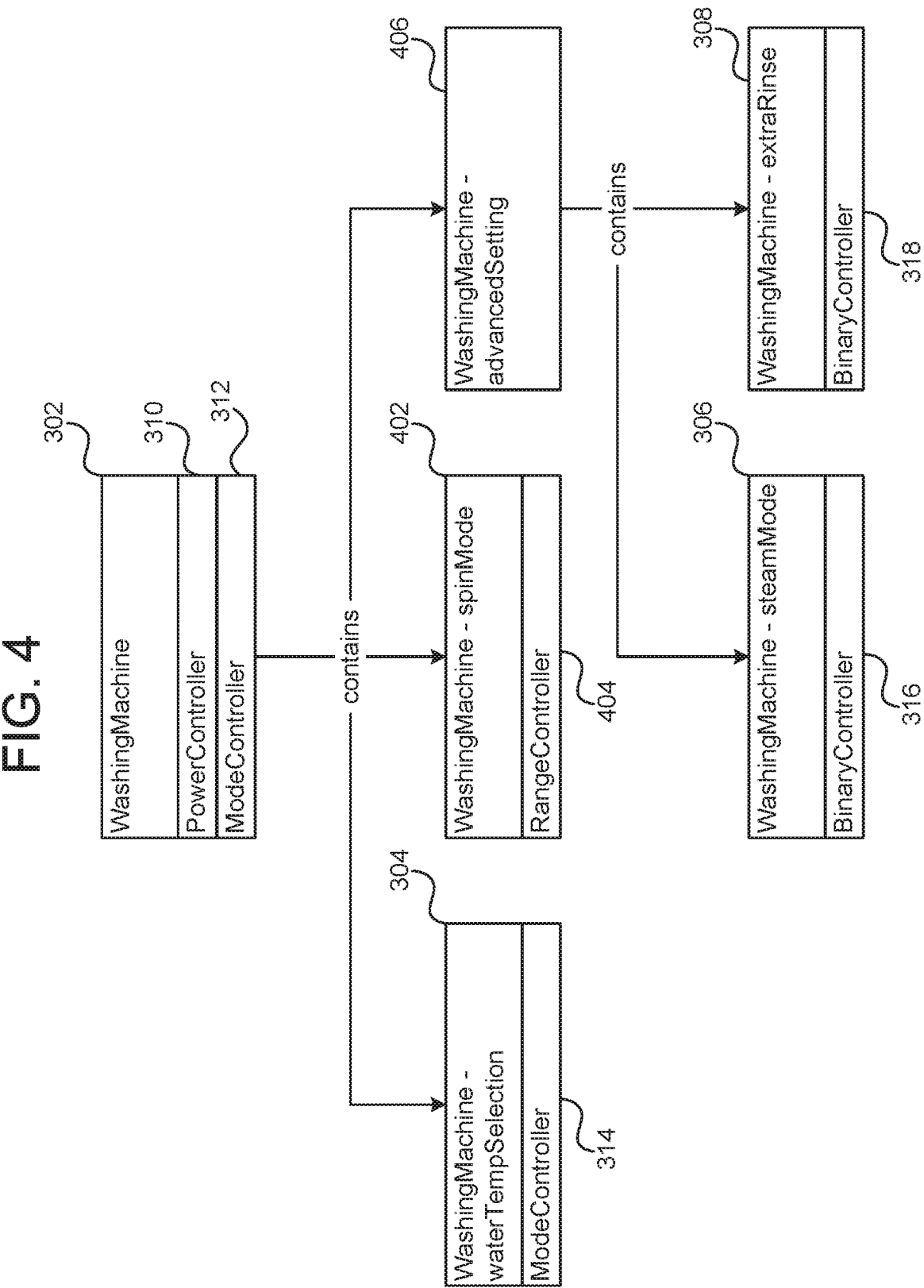
FIG. 4 is a conceptual diagram of related endpoint devices and functionality according to embodiments of the present disclosure.

FIG. 4 represents another example of how the first data may represent the washing machine 302 and its related endpoint devices. In comparison to FIG. 3, FIG. 4 illustrates that the first data may represent the washing machine 302 contains a spin mode component 402, and that the spin mode component 402 includes a range controller 404 (representing the system may receive user inputs to control a spin mode of the washing machine 302). In addition, as compared to FIG. 3, FIG. 4 illustrates that the first data may represent the washing machine 302 contains an advanced setting component 406, which contains the steam mode component 306 and the extra rinse component 308.

FIGS. 2 through 4 illustrate various examples of related endpoint devices. One skilled in the art will appreciate that other endpoint devices and their relationships may vary. For example, while not illustrated, the vehicle 202 may also or alternatively contain one or more automated seats and/or one or more automated locks. Moreover, one skilled in the art will appreciate that, while FIGS. 2 through 4 illustrate endpoint devices that are contained within other endpoint devices, other types of relationships are possible. For example, a relationship may represent a physical location of an endpoint device with respect to another endpoint device (e.g., a back-left burner of a stove is located behind a front-left burner of the stove), a relationship may represent one endpoint device uses data output by another endpoint device (e.g., a thermostat may use data output by a temperature sensor), a relationship may represent one endpoint device is part of a second endpoint device, etc. A relationship can be single valued (e.g., an endpoint device contains an endpoint device) or multi-valued (e.g., a first endpoint device is contained within a second endpoint device and is physically next to a third endpoint device). One skilled in the art will also appreciate that other types of controllers may be implemented. Illustrative types of controllers include toggle controllers (which represent an endpoint device may be controlled between on and off states), mode controllers (which represent an endpoint device may be set to distinct values), and range controllers (which represent an endpoint device may be set to distinct ranges of values). For example, a range controller for a fan may be set between spin speeds of 1 and 10, a thermostat may be set to various temperature ranges (e.g., various temperature degrees), and a stereo may be set to various stations. One skilled in the art will appreciate that the controllers of FIGS. 2 through 4 may be implemented as toggle controllers, mode controllers, and/or range controllers depending on how manufacturers of the endpoint devices have configured same. A controller associated with an endpoint device may be set by a manufacturer of the endpoint device. Thus, one skilled in the art will appreciate that the presently disclosed system may receive user inputs requesting the performance of actions that were not configured by the system.

Referring back to FIG. 1, after the system(s) 120 receives the first data, the system(s) 120 may receive (134) an indicator to associate a device identifier with a user profile. A user, who already has a user profile established with the system, may desire to associate a device with their user profile. For example, a user may purchase a new vehicle or appliance, and may desire the vehicle or appliance be associated with their user profile. The user may provide a device 110 with a user input representing a device is to be associated with their user profile, and optionally a device identifier (e.g., a serial number, vehicle identification number (VIN), etc.), a type of the device, and/or a manufacture of the device. The device 110 may send an indicator (representing the foregoing information) to the system(s) 120. The device 110 may send the indicator to the system(s) 120 via a companion application installed on the device 110. The companion application may enable the device 110 to communicate with the system(s) 120 via the network(s) 199. An example of a companion application is the Amazon Alexa application that operates on a phone/tablet.

The system(s) 120 may determine (136) a device profile for the user device. The device profile may include other types of endpoint devices associated with the device identifier (represented in the received indicator). For example, the system(s) 120 may determine the device identifier corresponds to a particular type of device (e.g., a vehicle, microwave, washing machine, etc.) and may determine a device profile associated with the type of device, with the device profile representing one or more endpoint device associated with the type of device. The system(s) 120 may associate (138) the device profile with the user profile associated with the user input.

The system(s) 120 may query one or more device manufacturer systems 130 (associated with the device identifier) to indicate the other types if endpoint devices associated with the device identifier (provided by the user). The system(s) 120 may receive, from the one or more device manufacturer systems 130, data representing the other types of endpoint devices as well as their corresponding relationships.

Figure 5:
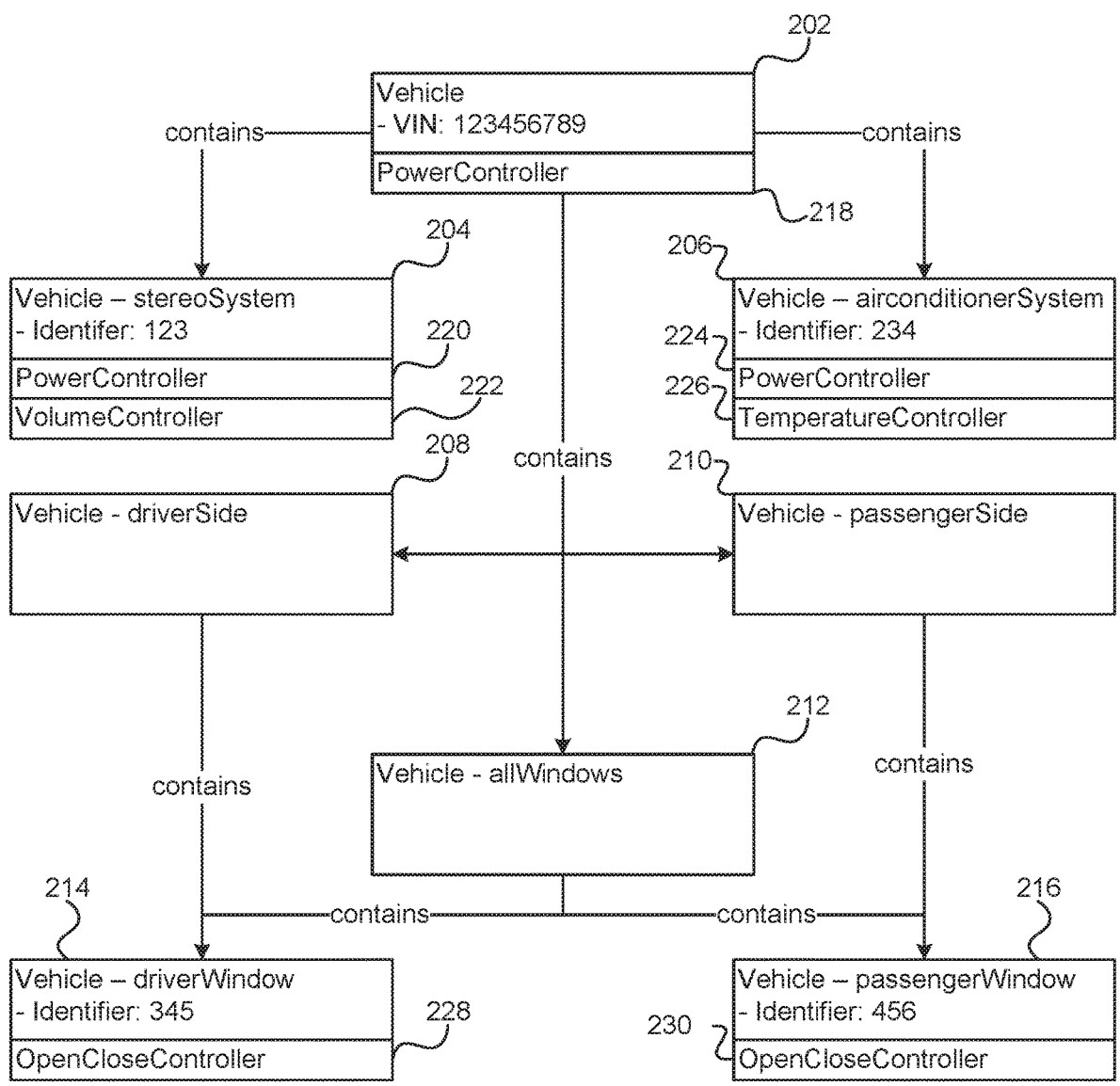
FIG. 5 is a conceptual diagram of user profile data representing a vehicle, the vehicle's various endpoint devices and respective functionality, and their relationships according to embodiments of the present disclosure.

In an example, the system(s) 120 may receive data representing a specific device identifiers of the other types of endpoint devices. FIG. 5 illustrates an example of such data, which may correspond to a device profile. A comparison of FIGS. 2 and 5 shows that the device profile includes specific identifiers for the device and other related endpoint devices.

In at least some examples, in response to receiving the indicator at step 134, the system 120 may determine first data (received at step 132) associated with a type of the user device to be associated newly associated with the user profile, and may associate that first data (representing a hierarchy of related devices associated with the device type)

with the user profile. This effectively associates a device type profile (representing related types of devices) with the user profile.

In at least some examples, step 132 may be omitted. That is, prior to the system(s) 120 receiving the device identifier at step 134, the system(s) 120 may not have a record of endpoint device relationships for a type of device to be newly associated with the user profile. In such examples, the data first representing endpoint device relationships to the system(s) 120 may include specific endpoint device identifiers, thereby representing a device profile. In other words, the system(s) 120 may not receive device relationship data with null device identifier values (as illustrated in FIGS. 2-4).

In some examples, the indicator (received at step 134) may represent an account identifier corresponding to a user profile of the user stored by a device manufacturer system(s) 130. When this occurs, step 136 may include, the system(s) 120 sending the account identifier to the device manufacturer system(s) 130. The device manufacturer system(s) 130 may use the account identifier to identify endpoint device identifiers (representing endpoint devices associated with the user account), and may send the endpoint device identifiers to the system(s) 120 (e.g., in the form of a device profile). The system(s) may then proceed with the processing of step 138.

After the system(s) 120 has associated the device profile with the user profile data at step 138, the system may receive a user input and respond to same using the device and/or user profile data (as illustrated in FIG. 6). The device 110a may receive audio 11 representing a spoken user input of the user 5. The device 110a may generate audio data representing the audio 11 and send the audio data to the system(s) 120, which the system(s) 120 receives (602). Alternatively, the device 110b may receive a text input representing a text-based user input of the user 5. The device 110b may generate text data representing the text input and may send the text data to the system(s) 120, which the system(s) 120 receives (602). Depending on configuration, the device (110a/110b) may send audio data or text data to the system(s) 120 via a companion application installed on the device (110a/110b).

If the system(s) 120 receives the user input as audio data, the system(s) 120 may perform (604) ASR processing on the audio data to generate text data. The system(s) 120 may perform (606) NLU processing (on the text data as received at step 602 or as generated at step 604) to determine an endpoint device identifier representing an endpoint device to be invoked in response to the user input. Using FIG. 5 as an example, if the user input corresponds to "turn on my car," "turn on the car," or the like, the system(s) 120 may determine the vehicle corresponding to VIN 123456789 is to be powered on. For further example, using FIG. 5, if the user input corresponds to "role down my driver side window" (or the like), the system(s) 120 may determine the endpoint device 345 (corresponding to the driver window of the vehicle) is to be invoked to set the window in a "down" position. The system(s) 120 may thereafter invoke (608) the endpoint device to execute with respect to the user input (e.g., perform the requested action).

The system may operate using various components as illustrated in FIG. 7. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 720 to perform wakeword detection to determine when a user intends to speak an input to the device 110. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 720 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 720 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 711, representing the audio 11, to the system(s) 120. The audio data 711 may include data corresponding to the wakeword, or the portion of the audio data 711 corresponding to the wakeword may be removed by the device 110 prior to sending the audio data 711 to the system(s) 120.

Upon receipt by the system(s) 120, the audio data 711 may be sent to an orchestrator component 730. The orchestrator component 730 may include memory and logic that enables the orchestrator component 730 to transmit various pieces and forms of data to various components of the system, as well as perform other operations as described herein.

The orchestrator component 730 sends the audio data 711 to an ASR component 750. The ASR component 750 transcribes the audio data 711 into text data. The text data output by the ASR component 750 represents one or more than one (e.g., in the form of an N-best list) ASR hypotheses representing speech represented in the audio data 711. The ASR component 750 interprets the speech in the audio data 711 based on a similarity between the audio data 711 and pre-established language models. For example, the ASR component 750 may compare the audio data 711 with models for sounds (e.g., subword units, such as phonemes, etc.) and sequences of sounds to identify words that match the sequence of sounds of the speech represented in the audio data 711. The ASR component 750 sends the text data generated thereby to an NLU component 760, for example via the orchestrator component 730. The text data output by the ASR component 750 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The device 110 may send text data 713 to the system(s) 120. Upon receipt by the system(s) 120, the text data 713 may be sent to the orchestrator component 730, which may send the text data 713 to the NLU component 760.

The NLU component 760 attempts to make a semantic interpretation of the phrase(s) or statement(s) represented in the text data input therein. That is, the NLU component 760 determines one or more meanings associated with the phrase(s) or statement(s) represented in the text data based on words represented in the text data. The NLU component 760 determines an intent representing an action that a user desires be performed as well as pieces of the text data that allow a device (e.g., the device 110, the system(s) 120, a skill component 790, a skill system(s) 725, etc.) to execute the intent. For example, if the text data corresponds to "play Adele music," the NLU component 760 may determine an intent that the system output music and may identify "Adele" as an artist. For further example, if the text data corresponds to "what is the weather," the NLU component 760 may determine an intent that the system output weather information associated with a geographic location of the device 110. In another example, if the text data corresponds to "turn off the lights," the NLU component 760 may determine an intent that the system turn off lights associated with the device 110 or the user 5.

The NLU component 760 may send NLU results data (which may include tagged text data, indicators of intent, etc.) to the orchestrator component 730. The orchestrator component 730 may send the NLU results data to a skill component(s) 790 configured to perform an action at least partially responsive the user input. The NLU results data may include a single NLU hypothesis, or may include an N-best list of NLU hypotheses.

A "skill component" may be software running on the system(s) 120 that is akin to a software application running on a traditional computing device. That is, a skill component 790 may enable the system(s) 120 to execute specific functionality in order to provide data or produce some other requested output. The system(s) 120 may be configured with more than one skill component 790. For example, a weather service skill component may enable the system(s) 120 to provide weather information, a car service skill component may enable the system(s) 120 to book a trip with respect to a taxi or ride sharing service, a restaurant skill component may enable the system(s) 120 to order a pizza with respect to the restaurant's online ordering system, etc. A skill component 790 may operate in conjunction between the system(s) 120 and other devices, such as the device 110, in order to complete certain functions. Inputs to a skill component 790 may come from speech processing interactions or through other interactions or input sources. A skill component 790 may include hardware, software, firmware, or the like that may be dedicated to a particular skill component 790 or shared among different skill components 790.

In addition or alternatively to being implemented by the system(s) 120, a skill component 790 may be implemented at least partially by a skill system(s) 725. Such may enable a skill system(s) 725 to execute specific functionality in order to provide data or perform some other action requested by a user. A device manufacturer system(s) 130 may be an example of a skill system(s) 725.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill component 790 dedicated to interacting with more than one skill system 725. The system(s) 120 may be configured with a skill component 790 that communicates with more than one type of device (e.g., different types of home automation devices). A manufacturer's device manufacturer system(s) 130 may be associated with a dedicated skill component 790.

Unless expressly stated otherwise, reference to a skill, skill device, or skill component may include a skill component 790 operated by the system(s) 120 and/or the skill system(s) 725. Moreover, the functionality described herein as a skill may be referred to using many different terms, such as an action, bot, app, or the like.

The system(s) 120 may include a TTS component 780 that generates audio data (e.g., synthesized speech) from text data using one or more different methods. Text data input to the TTS component 780 may come from a skill component 790, the orchestrator component 730, or another component of the system.

In one method of synthesis called unit selection, the TTS component 780 matches text data against a database of recorded speech. The TTS component 780 selects matching units of recorded speech and concatenates the units together to form audio data. In another method of synthesis called parametric synthesis, the TTS component 780 varies parameters such as frequency, volume, and noise to create audio data including an artificial speech waveform. Parametric synthesis uses a computerized voice generator, sometimes called a vocoder.

The system(s) 120 may include profile storage 770. The profile storage 770 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 770 may include one or more user profiles, with each user profile being associated with a different user identifier. Each user profile may include various user identifying information. Each user profile may also include preferences of the user and/or one or more device identifiers, representing one or more devices of the user.

The profile storage 770 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The profile storage 770 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household. Each device profile may include various related endpoint device identifiers, input/output capabilities of each endpoint device, and one or more capabilities performable by each endpoint device, for example.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

As illustrated in FIG. 8, a device profile may include data representing different endpoint devices. Each endpoint device may be associated with one or more of an identifier of the endpoint device, an invocation name of the endpoint device, data representing what other endpoint device(s) is related to the endpoint device, capabilities of the endpoint device, an identifier for each capability of the endpoint device, an invocation name for each capability of the endpoint device, a mode/preset for each capability of the endpoint device, and an invocation name for each mode/preset of each capability of the endpoint device.

The capability(ies) of an endpoint device (or the data representing the capability(ies) of an endpoint device) may be created by a manufacturer of the endpoint device, not the system. Thus, it will be appreciated that the system may be configured to cause actions to be performed in response to user inputs (e.g., by sending a command to execute to an endpoint device), even though the actions may not correspond to system configured actions.

The device profile may additionally include data representing which capabilities and/or modes may require user authentication for such capabilities and/or modes to be invoked. For example, the opening of a garage door may require user authentication but the closing the garage door may not.

Referring back to FIG. 7, the system(s) 120 may include a relationship storage 775. The relationship storage 775 may store data representing types of endpoint devices and their relationships. Components of the system(s) 120 may query the relationship storage 775 for data representing related endpoint devices for the purpose of relating endpoint devices with a user profile (stored in the profile storage 770). In an example, the relationship storage 775 mays store device profiles without specific device identifiers. That is, the relationship storage 775 may store, for example, device profiles as illustrated in FIGS. 2-4.

The system(s) 120 may include a user recognition component 795 that recognizes one or more users associated with data input to the system. The user recognition component 795 may take as input the audio data 711. The user recognition component 795 may perform user recognition by comparing audio characteristics in the audio data 711 to stored audio characteristics of users. The user recognition component 795 may also or alternatively perform user recognition by comparing biometric data (e.g., fingerprint data, iris data, etc.), received by the system in correlation with the present user input, to stored biometric data of users. The user recognition component 795 may also or alternatively perform user recognition by comparing image data (e.g., including a representation of at least a feature of a user), received by the system in correlation with the present user input, with stored image data including representations of features of different users. The user recognition component 795 may perform additional user recognition processes, including those known in the art. For a particular user input, the user recognition component 795 may perform processing with respect to stored data of users associated with the device 110 that captured the user input.

The user recognition component 795 determines whether user input originated from a particular user. For example, the user recognition component 795 may generate a first value representing a likelihood that the user input originated from a first user, a second value representing a likelihood that the user input originated from a second user, etc. The user recognition component 795 may also determine an overall confidence regarding the accuracy of user recognition operations.

The user recognition component 795 may output a single user identifier corresponding to the most likely user that originated the user input. Alternatively, the user recognition component 795 may output an N-best list of user identifiers with respective values representing likelihoods of respective users originating the user input. The output of the user recognition component 795 may be used to inform NLU processing, processing performed by a skill component 790, as well as processing performed by other components of the system.

Figure 9:
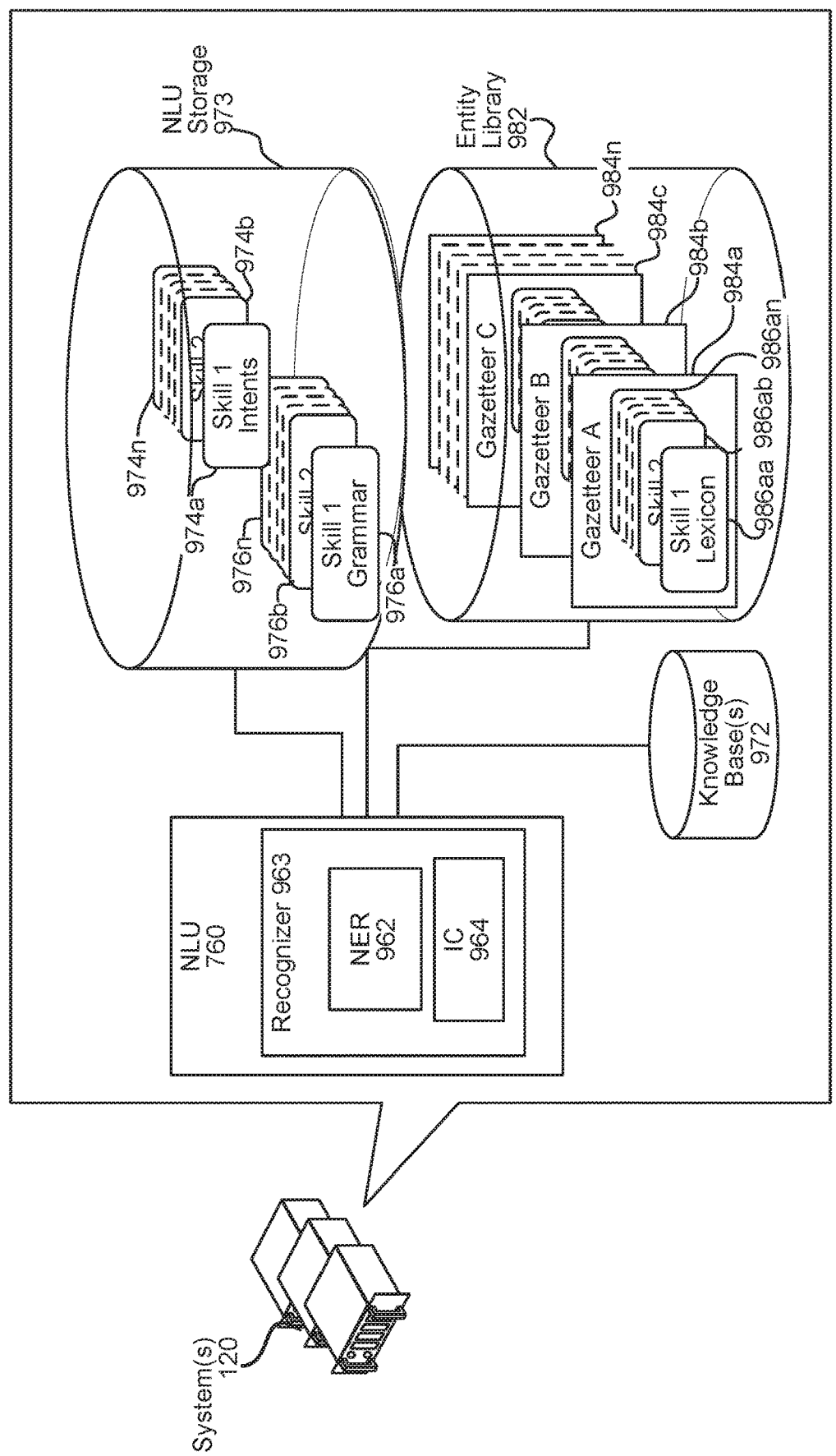
FIG. 9 is a conceptual diagram of how natural language understanding processing is performed according to embodiments of the present disclosure.

FIG. 9 illustrates how NLU processing is performed on text data. Generally, the NLU component 760 attempts to make a semantic interpretation of text data input thereto.

That is, the NLU component 760 determines the meaning behind text data based on the individual words and/or phrases represented therein. The NLU component 760 interprets text data to derive an intent of the user as well as pieces of the text data that allow a device (e.g., the device 110, the system(s) 120, skill system(s) 725, etc.) to complete that action.

The NLU component 760 may process text data including several hypotheses. For example, if the ASR component 750 outputs text data including an N-best list of ASR hypotheses, the NLU component 760 may process the text data with respect to all (or a portion of) the ASR hypotheses represented therein. Even though the ASR component 750 may output an N-best list of ASR hypotheses, the NLU component 760 may be configured to only process with respect to the top scoring ASR hypothesis in the N-best list.

The NLU component 760 may include one or more recognizers 963. Each recognizer 963 may be associated with a different skill component 790. Each recognizer 963 may process with respect to text data input to the NLU component 760. Each recognizer 963 may operate at least partially in parallel with other recognizers 963 of the NLU component 760.

Each recognizer 963 may include a named entity recognition (NER) component 962. The NER component 962 attempts to identify grammars and lexical information that may be used to construe meaning with respect to text data input therein. The NER component 962 identifies portions of text data that correspond to a named entity that may be applicable to processing performed by a skill component 790, associated with the recognizer 963 implementing the NER component 962. The NER component 962 (or other component of the NLU component 760) may also determine whether a word refers to an entity whose identity is not explicitly mentioned in the text data, for example "him," "her," "it" or other anaphora, exophora or the like.

Each recognizer 963, and more specifically each NER component 962, may be associated with a particular grammar model and/or database 973, a particular set of intents/actions 974, and a particular personalized lexicon 986. Each gazetteer 984 may include skill-indexed lexical information associated with a particular user and/or device 110. For example, a Gazetteer A (984*a*) includes skill-indexed lexical information 986*aa* to 986*an*. A user's music skill lexical information might include album titles, artist names, and song names, for example, whereas a user's contact list skill lexical information might include the names of contacts. Since every user's music collection and contact list is presumably different, this personalized information improves entity resolution.

An NER component 962 applies grammar models 976 and lexical information 986 associated with the skill component 790 (associated with the recognizer 963 implementing the NER component 962) to determine a mention of one or more entities in text data. In this manner, the NER component 962 identifies "slots" (corresponding to one or more particular words in text data) that may be needed for later processing. The NER component 962 may also label each slot with a type (e.g., noun, place, city, artist name, song name, etc.).

Each grammar model 976 includes the names of entities (i.e., nouns) commonly found in speech about the particular skill component 790 to which the grammar model 976 relates, whereas the lexical information 986 is personalized to the user and/or the device 110 from which the user input originated. For example, a grammar model 976 associated with a shopping skill component may include a database of words commonly used when people discuss shopping.

A downstream process called named entity resolution (discussed in detail elsewhere herein) actually links a portion of text data to an actual specific entity known to the system. To perform named entity resolution, the NLU component 760 may utilize gazetteer information (984*a*-984*n*) stored in an entity library storage 982. The gazetteer information 984 may be used to match text data with different entities, such as song titles, contact names, etc. Gazetteers 984 may be linked to users (e.g., a particular gazetteer may be associated with a specific user's music collection), may be linked to certain skill components 790 (e.g., a shopping skill component, a music skill component, a video skill component, a device-specific skill component, etc.), or may be organized in a variety of other ways.

Each recognizer 963 may also include an intent classification (IC) component 964. An IC component 964 parses text data to determine an intent(s), associated with the skill component 790 (associated with the recognizer 963 implementing the IC component 964), that potentially represents the user input. An intent represents to an action a user desires be performed. An IC component 964 may communicate with a database 974 of words linked to intents. For example, a music intent database may link words and phrases such as "quiet," "volume off," and "mute" to a <Mute> intent. An IC component 964 identifies potential intents by comparing words and phrases in text data to the words and phrases in an intents database 974, associated with the skill component 790 that is associated with the recognizer 963 implementing the IC component 964.

The intents identifiable by a specific IC component 964 are linked to skill-specific (i.e., the skill component 790 associated with the recognizer 963 implementing the IC component 964) grammar frameworks 976 with "slots" to be filled. Each slot of a grammar framework 976 corresponds to a portion of text data that the system believes corresponds to an entity. For example, a grammar framework 976 corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks 976 may not be structured as sentences, but rather based on associating slots with grammatical tags.

For example, an NER component 962 may parse text data to identify words as subject, object, verb, preposition, etc. based on grammar rules and/or models prior to recognizing named entities in the text data. An IC component 964 (implemented by the same recognizer 963 as the NER component 962) may use the identified verb to identify an intent. The NER component 962 may then determine a grammar model 976 associated with the identified intent. For example, a grammar model 976 for an intent corresponding to <PlayMusic> may specify a list of slots applicable to play the identified "object" and any object modifier (e.g., a prepositional phrase), such as {Artist Name}, {Album Name}, {Song name}, etc. The NER component 962 may then search corresponding fields in a lexicon 986 (associated with the skill component 790 associated with the recognizer 963 implementing the NER component 962), attempting to match words and phrases in text data the NER component 962 previously tagged as a grammatical object or object modifier with those identified in the lexicon 986.

An NER component 962 may perform semantic tagging, which is the labeling of a word or combination of words according to their type/semantic meaning. An NER component 962 may parse text data using heuristic grammar rules, or a model may be constructed using techniques such as hidden Markov models, maximum entropy models, log linear models, conditional random fields (CRF), and the like. For example, an NER component 962 implemented by a music skill recognizer may parse and tag text data corresponding to "play mother's little helper by the rolling stones" as {Verb}: "Play," {Object}: "mother's little helper," {Object Preposition}: "by," and {Object Modifier}: "the rolling stones." The NER component 962 identifies "Play" as a verb based on a word database associated with the music skill, which an IC component 964 (also implemented by the music skill recognizer) may determine corresponds to a <PlayMusic> intent. At this stage, no determination has been made as to the meaning of "mother's little helper" and "the rolling stones," but based on grammar rules and models, the NER component 962 has determined the text of these phrases relates to the grammatical object (i.e., entity) of the user input represented in the text data.

The frameworks linked to the intent are then used to determine what database fields should be searched to determine the meaning of these phrases, such as searching a user's gazetteer 984 for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer 984 does not resolve a slot/field using gazetteer information, the NER component 962 may search a database of generic words associated with the skill component 790 (in the knowledge base 972). For example, if the text data includes "play songs by the rolling stones," after failing to determine an album name or song name called "songs" by "the rolling stones," the NER component 962 may search the skill vocabulary for the word "songs." In the alternative, generic words may be checked before the gazetteer information, or both may be tried, potentially producing two different results.

An NER component 962 may tag text data to attribute meaning thereto. For example, an NER component 962 may tag "play mother's little helper by the rolling stones" as: {skill} Music, {intent}<PlayMusic>, {artist name} rolling stones, {media type} SONG, and {song title} mother's little helper. For further example, the NER component 962 may tag "play songs by the rolling stones" as: {skill} Music, {intent}<PlayMusic>, {artist name} rolling stones, and {media type} SONG.

Figure 10:
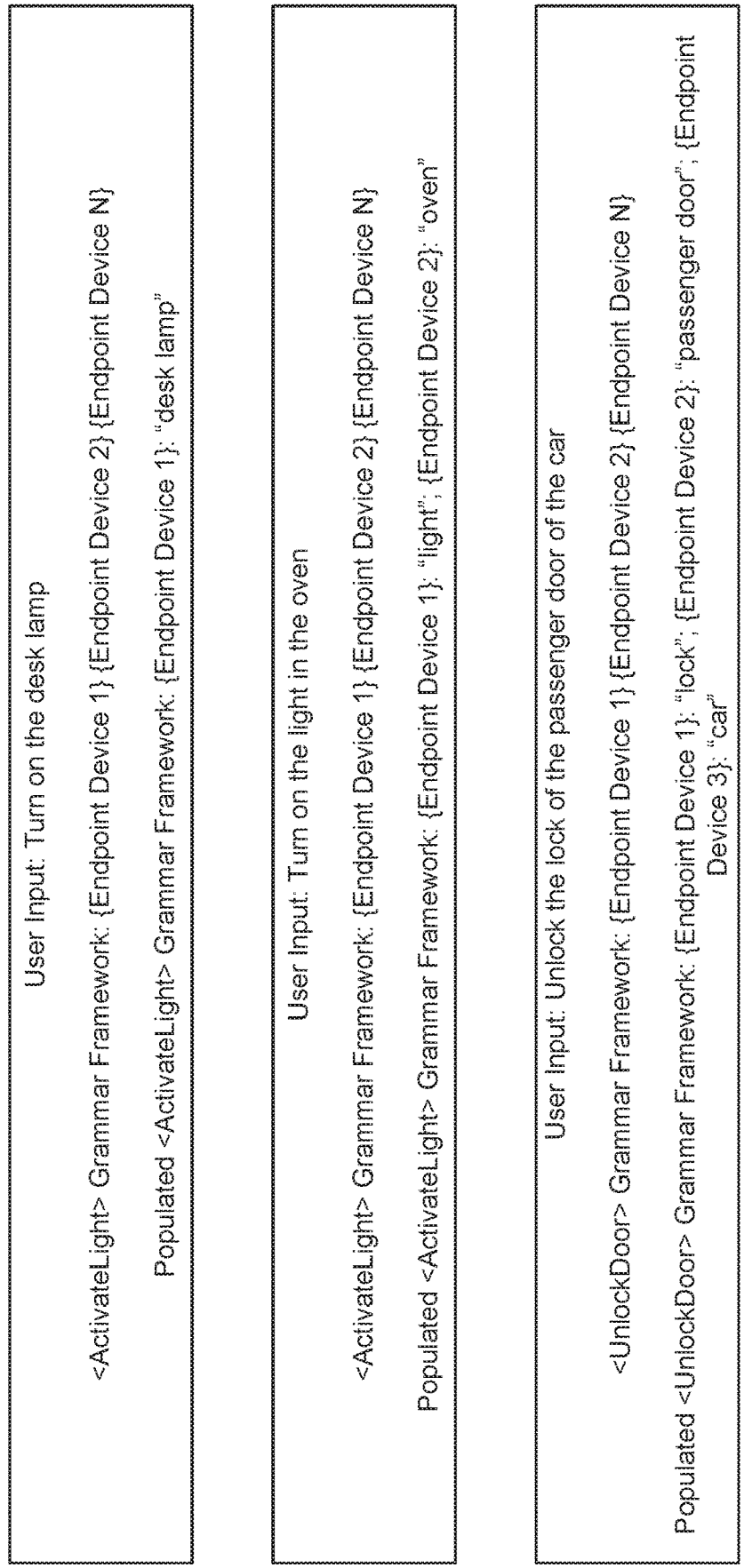
FIG. 10 is a conceptual diagram illustrating examples of named entity recognition and intent classification processing according to embodiments of the present disclosure.

FIG. 10 includes further examples of NER and IC processing. For example, for the user input of "turn on the desk lamp," the NER component 962 may determine "turn on" corresponds to a verb(s) and may determine "desk lamp" corresponds to an object. The IC component 964 may determine an <ActivateLight> grammar framework corresponds thereto. The <ActivateLight> grammar framework may include slots for one or more endpoint devices. The NER component 962 may populate a first endpoint device slot of the <ActivateLight> grammar framework with the object "desk lamp." For further example, for the user input of "turn on the light in the oven," the NER component 962 may determine "turn on" corresponds to a verb(s), and may determine "light" and "oven" correspond to objects. The IC component 964 may determine the <ActivateLight> grammar framework corresponds thereto. The NER component 962 may populate a first endpoint device slot of the <Acti-vateLight> grammar framework with the object "light" and a second endpoint device slot of the <ActivateLight> grammar framework with the object "oven." In another example, for the user input of "unlock the passenger door of the car," the NER component may determine "unlock" corresponds to a verb, "lock" corresponds to an object, "passenger door" corresponds to an object, and "car" corresponds to an object. The IC component 964 may determine an <UnlockDoor> grammar framework corresponds thereto. The <UnlockDoor> grammar framework may include slots for one or more endpoint devices. The NER component 962 may populate a first endpoint device slot of the <UnlockDoor> grammar framework with the object "lock," may populate a second endpoint device slot of the <UnlockDoor> grammar framework with the object "passenger door," and may populate a third endpoint device slot of the <UnlockDoor> grammar framework with the object "car." One skilled in the art will appreciate that a grammar framework may include as many endpoint device slots as necessary to adequately represent the user input.

The NLU component 760 may generate cross-skill N-best list data 1140, which may include a list of NLU hypotheses output by each recognizer 963 (as illustrated in FIG. 11). A recognizer 963 may output tagged text data generated by an NER component 962 and an IC component 964 operated by the recognizer 963, as described above. Each NLU hypothesis including an intent indicator and text/slots may be grouped as an NLU hypothesis represented in the cross-skill N-best list data 1140. Each NLU hypothesis may also be associated with one or more respective score(s) for the NLU hypothesis. For example, the cross-skill N-best list data 1140 may be represented as, with each line representing a separate NLU hypothesis:

[0.95] Intent: <PlayMusic> ArtistName: Lady Gaga SongName: Poker Face

[0.95] Intent: <PlayVideo> ArtistName: Lady Gaga VideoName: Poker Face

[0.01] Intent: <PlayMusic> ArtistName: Lady Gaga AlbumName: Poker Face

[0.01] Intent: <PlayMusic> SongName: Pokerface

The NLU component 760 may send the cross-skill N-best list data 1140 to a pruning component 1150. The pruning component 1150 may sort the NLU hypotheses represented in the cross-skill N-best list data 1140 according to their respective scores. The pruning component 1150 may then perform score thresholding with respect to the cross-skill N-best list data 1140. For example, the pruning component 1150 may select NLU hypotheses represented in the cross-skill N-best list data 1140 associated with confidence scores satisfying (e.g., meeting and/or exceeding) a threshold confidence score. The pruning component 1150 may also or alternatively perform number of NLU hypothesis thresholding. For example, the pruning component 1150 may select a maximum threshold number of top scoring NLU hypotheses. The pruning component 1150 may generate cross-skill N-best list data 1160 including the selected NLU hypotheses. The purpose of the pruning component 1150 is to create a reduced list of NLU hypotheses so that downstream, more resource intensive, processes may only operate on the NLU hypotheses that most likely represent the user's intent.

The NLU component 760 may also include a light slot filler component 1152. The light slot filler component 1152 can take text data from slots represented in the NLU hypotheses output by the pruning component 1150 and alter it to make the text data more easily processed by downstream components. The light slot filler component 1152 may perform low latency operations that do not involve heavy operations such as reference to a knowledge base. The purpose of the light slot filler component 1152 is to replace words with other words or values that may be more easily understood by downstream system components. For example, if an NLU hypothesis includes the word "tomorrow," the light slot filler component 1152 may replace the word "tomorrow" with an actual date for purposes of downstream processing. Similarly, the light slot filler component 1152 may replace the word "CD" with "album" or the words "compact disc." The replaced words are then included in the cross-skill N-best list data 1160.

The NLU component 760 sends the cross-skill N-best list data 1160 to an entity resolution component 1170. The entity resolution component 1170 can apply rules or other instructions to standardize labels or tokens from previous stages into an intent/slot representation. The precise transformation may depend on the skill component 790. For example, for a travel skill component, the entity resolution component 1170 may transform text data corresponding to "Boston airport" to the standard BOS three-letter code referring to the airport. The entity resolution component 1170 can refer to a knowledge base that is used to specifically identify the precise entity referred to in each slot of each NLU hypothesis represented in the cross-skill N-best list data 1160. Specific intent/slot combinations may also be tied to a particular source, which may then be used to resolve the text data. In the example "play songs by the stones," the entity resolution component 1170 may reference a personal music catalog, Amazon Music account, user profile data, or the like. The entity resolution component 1170 may output text data including an altered N-best list that is based on the cross-skill N-best list data 1160, and that includes more detailed information (e.g., entity IDs) about the specific entities mentioned in the slots and/or more detailed slot data that can eventually be used by downstream components to perform an action responsive to the user input. The NLU component 760 may include multiple entity resolution components 1170 and each entity resolution component 1170 may be specific to one or more skill components 790.

FIG. 12 illustrates how entity resolution processing may include using user and/or device profile data to populate slots with endpoint device identifiers. Using the user input of "turn on the left burner of the oven" as an example, the NER component 962 may determine "turn on" corresponds to a verb(s), and may determine "left burner" and "oven" correspond to objects. The IC component 964 may determine an <ActivateBurner> grammar framework corresponds thereto. The NER component 962 may populate a first endpoint device slot of the <ActivateBurner> grammar framework with the object "left burner" and a second endpoint device slot of the <ActivateBurner> grammar framework with the object "oven." The entity resolution component 1170 may determine user and/or device profile data, associated with the present user input, includes data representing a stove that contains a left burner. Based thereon, the entity resolution component 1170 assigns the endpoint identifier for the stove to the {Endpoint Device 2} slot and the endpoint identifier for the left burner to the {Endpoint Device 1} slot.

This relationship data in the user and/or device profile enables the entity resolution component 1170 to resolve the proper entities. For example, the user profile may represent the stove and a grill, a stove device profile associated with the user profile may represent the stove contains the left burner, and a grill device profile associated with the user profile may represent the grill contains a left burner. If the user profile was not associated with such device profiles (e.g., the user profile only included particular invocation names as some present systems do), the entity resolution component 1170 may be incapable of resolving the slots of the framework to particular identifiers (or may have incorrectly resolved the {Endpoint Device 1} slot to include the identifier of the left burner of the grill).

While FIG. 12 illustrates one-to-one correspondence between entities represented in a user input and related entities in a user and/or device profile, one skilled in the art will appreciate that a system may infer endpoint devices that are not represented in a user input. For example, a user profile may represent that a vehicle contains a passenger door and that the passenger door contains a lock. For the user input of "unlock passenger door," the system may determine a slot for the passenger door based on same be represented in the user input, and may infer a slot for the vehicle and a slot for the lock using the endpoint device relationships represented in the user and/or device profile. Thus, a system may implicitly determine, based on context, endpoint devices not specifically mentioned in user inputs. This processing may be performed as part of entity resolution.

Referring back to FIG. 11, the entity resolution component 770 may not be successful in resolving every entity and filling every slot represented in the cross-skill N-best list data 1160. This may result in the entity resolution component 1170 outputting incomplete results.

The NLU component 760 may include a ranker component 1190. The ranker component 1190 may assign a particular confidence score to each NLU hypothesis input therein. The confidence score of an NLU hypothesis may represent a confidence of the system in the NLU processing performed with respect to the NLU hypothesis. The confidence score of a particular NLU hypothesis may be affected by whether the NLU hypothesis has unfilled slots. For example, if an NLU hypothesis associated with a first skill component includes slots that are all filled/resolved, that NLU hypothesis may be assigned a higher confidence score than another NLU hypothesis including at least some slots that are unfilled/unresolved by the entity resolution component 1170.

The ranker component 1190 may apply re-scoring, biasing, and/or other techniques to determine the top scoring NLU hypotheses. To do so, the ranker component 1190 may consider not only the data output by the entity resolution component 1170, but may also consider other data 1191. The other data 1191 may include a variety of information. The other data 1191 may include skill component 1190 rating or popularity data. For example, if one skill component 790 has a particularly high rating, the ranker component 1190 may increase the score of an NLU hypothesis associated with that skill component 790, and vice versa. The other data 1191 may include information about skill components 790 that have been enabled for the user identifier and/or device identifier associated with the current user input. For example, the ranker component 1190 may assign higher scores to NLU hypotheses associated with enabled skill components 790 than NLU hypotheses associated with non-enabled skill components 790. The other data 1191 may include data indicating user usage history, such as if the user identifier associated with the current user input is regularly associated with user input that invokes a particular skill component 790 or does so at particular times of day. The other data 1191 may include data indicating date, time, location, weather, type of device 110, user identifier, device identifier, context, as well as other information. For example, the ranker component 1190 may consider when any particular skill component 790 is currently active (e.g., music being played, a game being played, etc.) with respect to the user or device associated with the current user input. The other data 1191 may include device type information. For example, if the device 110 does not include a display, the ranker component 1190 may decrease the score associated with NLU hypotheses that would result in displayable content being presented to a user, and vice versa.

Following ranking by the ranker component 1190, the NLU component 760 may output NLU results data 1185 to the orchestrator component 730. The NLU results data 1185 may include the top scoring NLU hypotheses (e.g., in the form of an N-best list) as determined by the ranker component 1190. Alternatively, the NLU results data 1185 may include the top scoring NLU hypothesis as determined by the ranker component 1190.

The orchestrator component 730 may select a skill component 790, based on the NLU results data 1185, for performing an action responsive to the user input. In an example, the orchestrator component 730 may send all (or a portion of) the NLU results data 1185 to a skill component 790 associated with an endpoint device that is represented in the NLU results data 1185 and to be invoked to perform an action responsive to the user input.

Figure 13:
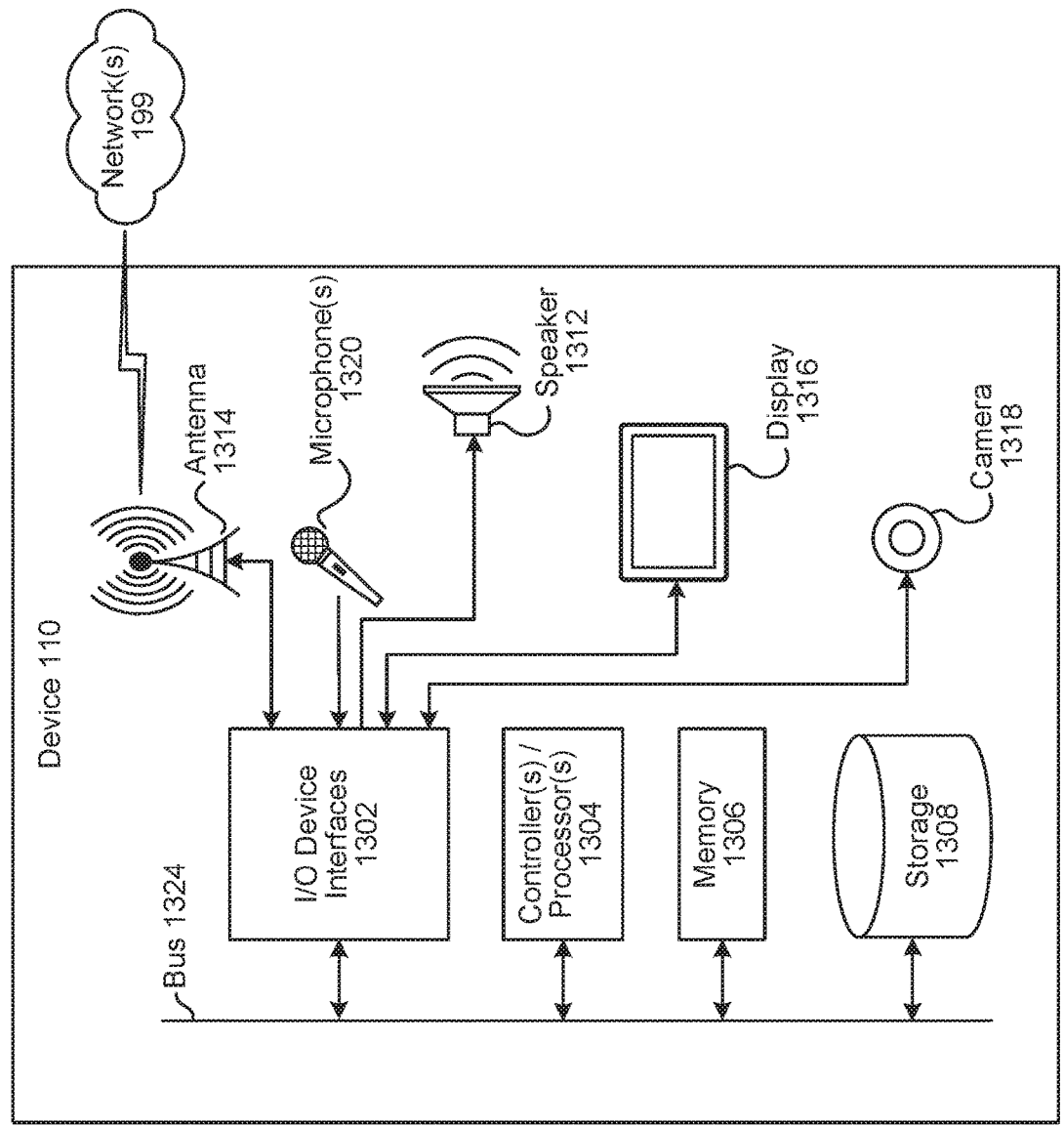
FIG. 13 is a block diagram conceptually illustrating example components of a device according to embodiments of the present disclosure.
Figure 14:
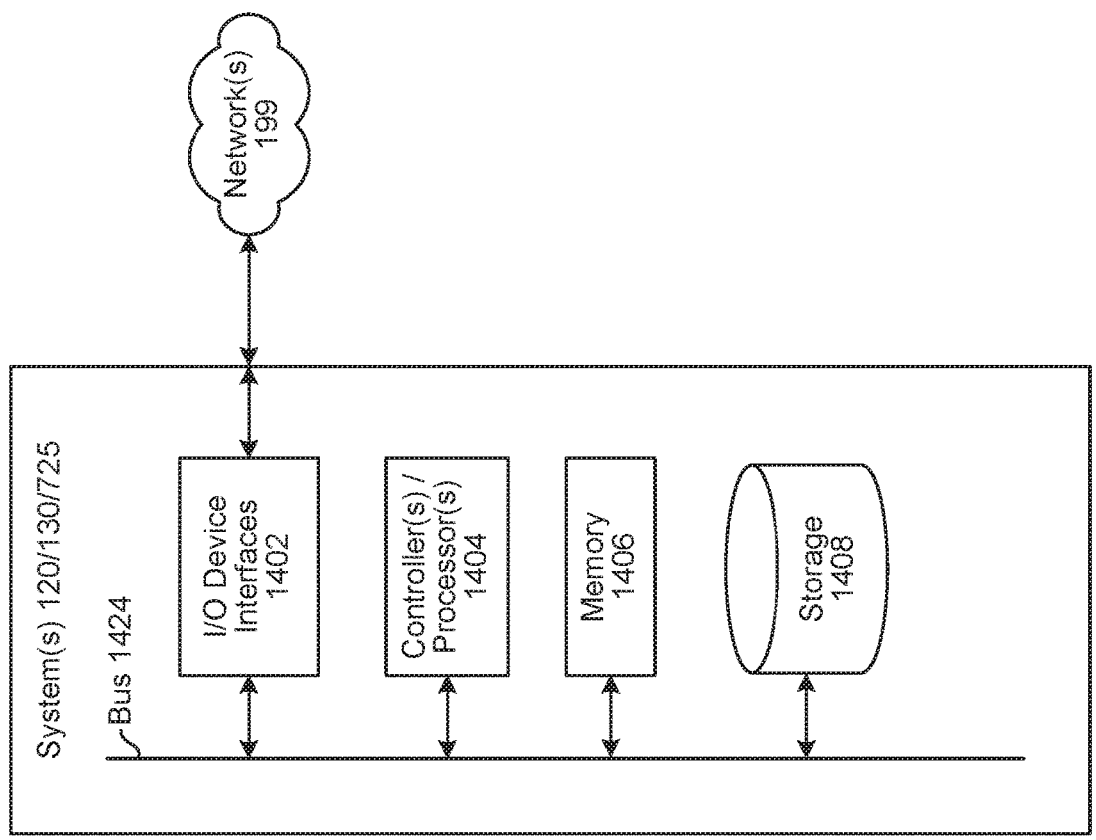
FIG. 14 is a block diagram conceptually illustrating example components of a system according to embodiments of the present disclosure.

FIG. 13 is a block diagram conceptually illustrating a device 110 that may be used with the system. FIG. 14 is a block diagram conceptually illustrating example components of a remote device, such as the system(s) 120, which may assist with ASR processing, NLU processing, etc., the device manufacturer system(s) 130, and the skill system(s) 725. A system (120/130/725) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple system (120/130/725) may be included in the overall system of the present disclosure, such as one or more systems 120 for performing ASR processing, one or more systems 120 for performing NLU processing, one or more device manufacturer systems 130 for providing the system(s) 120 with data representing related endpoint devices, one or more skill system(s) 725 for performing actions responsive to user inputs, etc. In operation, each of these systems may include computer-readable and computer-executable instructions that reside on the respective device (120/130/725), as will be discussed further below.

Each of these devices (110/120/130/725) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/130/725) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/130/725) may also be connected to removable or external non-volatile memory and/or storage (such as a removable memory card, memory key drive, networked storage, etc.) through respective input/output device interfaces (1302/1402).

Computer instructions for operating each device (110/120/130/725) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/130/725) includes input/output device interfaces (1302/1402). A variety of components may be connected through the input/output device interfaces (1302/1402), as will be discussed further below. Additionally, each device (110/120/130/725) may include an address/data bus (1324/1424) for conveying data among components of the respective device. Each component within a device (110/120/130/725) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the input/output device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1302/1402) may also include communication components that allow data to be exchanged between devices such as different physical servers in a collection of servers or other components.

The components of the device(s) 110, the system(s) 120, the device manufacturer system(s) 130, or the skill system(s) 725 may include their own dedicated processors, memory, and/or storage. Alternatively, one or more of the components of the device(s) 110, the system(s) 120, the device manufacturer system(s) 130, or the skill system(s) 225 may utilize the I/O interfaces (1302/1402), processor(s) (1304/1404), memory (1306/1406), and/or storage (1308/1408) of the device(s) 110 system(s) 120, the device manufacturer system(s) 130, or the skill system(s) 725, respectively. Thus, the ASR component 750 may have its own I/O interface(s), processor(s), memory, and/or storage; the NLU component 760 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, the device manufacturer system(s) 130, and the skill system(s) 725, as described herein, are illustrative, and may be located as a stand-alone device or may be included, in whole or in part, as a component of a larger device or system.

Figure 15:
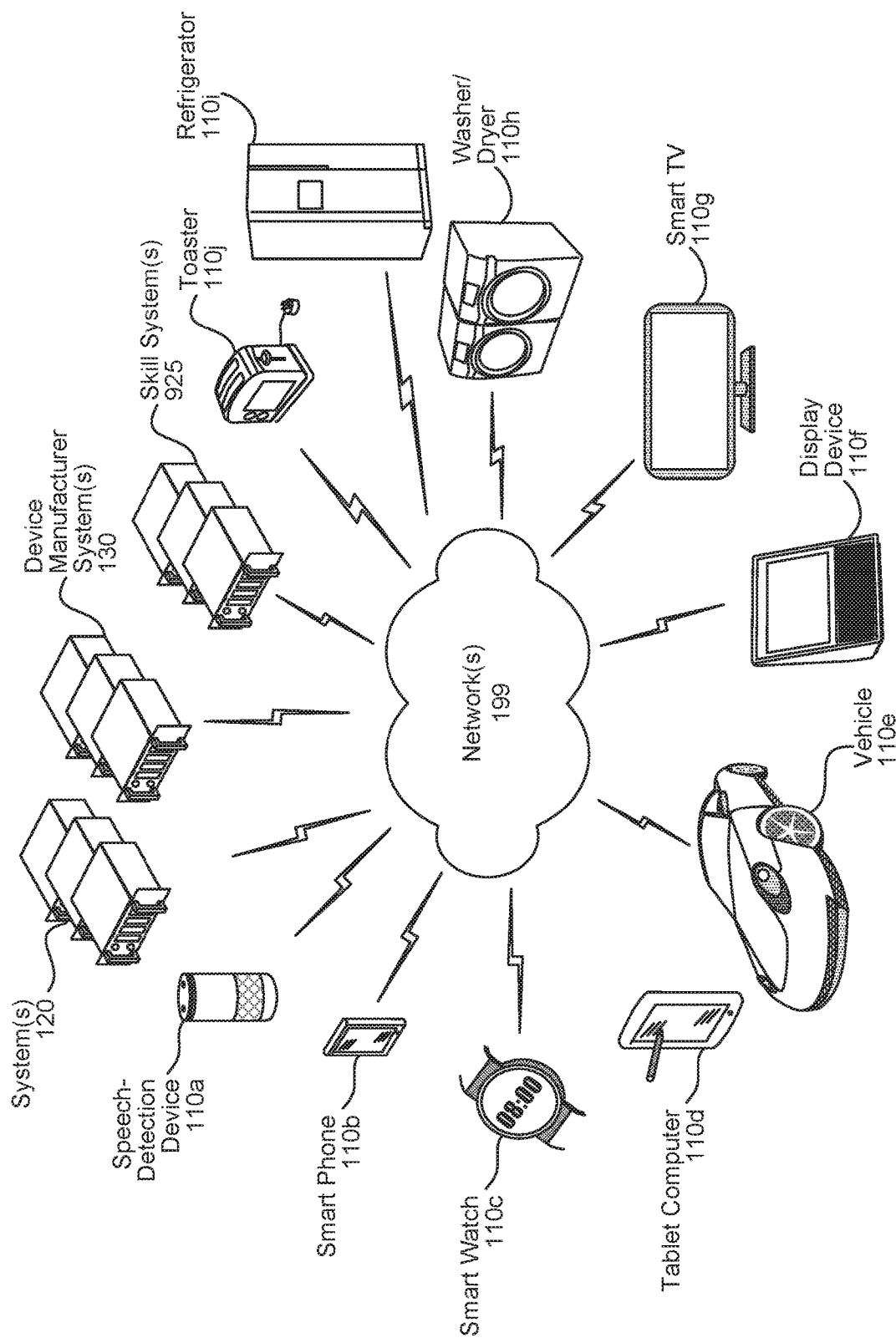
FIG. 15 illustrates an example of a computer network for use with the speech processing system.

As illustrated in FIG. 15, multiple devices (110a-110j, 120, 130, 725) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g, a washer/dryer 110h, a refrigerator 110i, and/or a toaster 110j may be connected to the network(s) 199 through a wireless service provider, over a WiFi or cellular network connection, or the like. Other devices are included as network-connected support devices, such as the system(s) 120, the device manufacturer system(s) 130, the skill system(s) 725, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 750, the NLU component 760, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving, from a system associated with a device manufacturer, first data representing a relationship between a user device type and a functionality type;
storing device profile data representing the first data;
after storing the device profile data, receiving an indicator representing a first device is to be associated with user profile data;
determining a device identifier corresponding to the first device;
determining the device identifier corresponds to the user device type;
based at least in part on determining the device identifier corresponds to the user device type, associating the device profile data with the user profile data;
after associating the device profile data with the user profile data, receiving, from the first device, audio data representing a spoken user input;
performing automatic speech recognition (ASR) processing on the audio data to generate text data;
using the device profile data, performing natural language understanding (NLU) processing on the text data to generate NLU results data representing a first component of the first device, the first component corresponding to the functionality type; and
causing the first component to execute with respect to the NLU results data.

2. The method of claim 1, wherein generating the NLU results data comprises:
as part of named entity recognition (NER) processing, determining the text data includes a first portion representing the user device type;
as part of the NER processing, determining the text data includes a second portion representing the functionality type;
as part of intent classification processing, determining the text data corresponds to a grammar framework, the grammar framework corresponding to an expected framework for receiving a user input;
as part of the NER processing, populating a first portion of the grammar framework with the first portion of the text data;
as part of NER processing, populating a second portion of the grammar framework with the second portion of the text data;
as part of entity resolution processing and using the device profile data, associating the device identifier with the first portion of the grammar framework; and
as part of the entity resolution processing and using the device profile data, associating a component identifier with the second portion of the grammar framework, the component identifier corresponding to the first component.

3. The method of claim 1, further comprising:
receiving second data representing a first functionality associated with the functionality type, the first functionality corresponding to at least one of changing a range of values, changing a mode of operation, or toggling between two values; and
storing the second data as part of the device profile data.

4. The method of claim 3, further comprising:
after associating the device profile data with the user profile data, receiving, from the first device, second audio data representing a second spoken user input;
performing ASR processing on the second audio data to generate second text data;
using the device profile data, performing NLU processing on the second text data to generate second NLU results data representing the first component and the first functionality, the first functionality being undefined with respect to NLU processing previous to the second data being received; and
causing the first component to execute the first functionality.

5. A method, comprising:
receiving first data corresponding to a first device type, the first data representing a relationship between the first device type and a second device type;
storing device profile data representing the first data;
receiving an indicator representing a first device is to be associated with user profile data;
determining the first device corresponds to the first device type;
based at least in part on determining the first device corresponds to the first device type, associating the device profile data with the user profile data;
receiving, from the first device, second data representing a user input;
determining, using the device profile data, that the second data represents a second device, corresponding to the second device type, is to perform an action at least partially responsive to the user input; and
causing the second device to execute.

6. The method of claim 5, further comprising:
determining the second data includes a portion representing the second device type;
determining the second data corresponds to a grammar framework;
populating a portion of the grammar framework with the portion of the second data; and
after populating the portion of the grammar framework and with the portion of the second data, associating a device identifier, representing the second device, with the portion of the grammar framework.

7. The method of claim 5, further comprising:
receiving third data representing a capability associated with the second device type, the capability corresponding to at least one of changing a range of values, change a mode of operation, or toggling between two values; and
storing the third data as part of the device profile data.

8. The method of claim 5, wherein the second data corresponds to audio data representing a spoken user input, and wherein the method further comprises:
performing automatic speech recognition (ASR) processing on the audio data to generate text data; and
performing natural language understanding (NLU) processing on the text data to determine the second device is to perform the action.

9. The method of claim 5, further comprising:
receiving, as part of the first data, an invocation name for the second device type.

10. The method of claim 5, further comprising:
determining the relationship represents the second device type is contained within the first device type.

11. The method of claim 5, further comprising:
determining the first data further represents at least one functionality corresponding to the second device type.

12. The method of claim 5, further comprising:
after receiving the indicator, receiving, from a system associated with a device manufacturer, a device identifier corresponding to the second device; and
storing, in the device profile date, an association between the device identifier and the second device type.

13. A system, comprising:
at least one processor; and
at least one memory comprising instructions that, when executed by the at least one processor, cause the system to:
receive first data corresponding to a first device type, the first data representing a relationship between the first device type and a second device type;
store device profile data representing the first data;
receive an indicator representing a first device is to be associated with user profile data;
determine the first device corresponds to the first device type;
based at least in part on determining the first device corresponds to the first device type, associate the device profile data with the user profile data;
receive, from the first device, second data representing a user input;
determine, using the device profile data, that the second data represents a second device, corresponding to the second device type, is to perform an action at least partially responsive to the user input; and
cause the second device to execute.

14. The system of claim 13, wherein the at least one memory further comprises instructions that, when executed by the at least one processor, further cause the system to:
- determine the second data includes a portion representing the second device type;
- determine the second data corresponds to a grammar framework;
- populate a portion of the grammar framework with the portion of the second data; and
- after populating the portion of the grammar framework and with the portion of the second data, associate a device identifier, representing the second device, with the portion of the grammar framework.

15. The system of claim 13, wherein the at least one memory further comprises instructions that, when executed by the at least one processor, further cause the system to:
- receive third data representing a capability associated with the second device type, the capability corresponding to at least one of changing a range of values, change a mode of operation, or toggling between two values; and
- store the third data as part of the device profile data.

16. The system of claim 13, wherein the second data corresponds to audio data representing a spoken user input, and wherein the at least one memory further comprises instructions that, when executed by the at least one processor, further cause the system to:
- perform automatic speech recognition (ASR) processing on the audio data to generate text data; and
- perform natural language understanding (NLU) processing on the text data to determine the second device is to perform the action.

17. The system of claim 13, wherein the first data further represents an invocation name for the second device type.

18. The system of claim 13, wherein the relationship represents the second device type is contained within the first device type.

19. The system of claim 13, wherein the first data further represents at least one functionality corresponding to the second device type.

20. The system of claim 13, wherein the at least one memory further comprises instructions that, when executed by the at least one processor, further cause the system to:
- after receiving the indicator, receive, from component first system associated with a device manufacturer, a device identifier corresponding to the second device; and
- store, in the device profile data, an association between the device identifier and the second device type.

* * * * *